3,093,242
PACKAGED ARTICLE FOR ETHYLENE OXIDE STERILIZATION AND SUBSEQUENT STORAGE
Willard M. Huyck, Woodland Hills, and Vincent A. Romito, North Hollywood, Calif., assignors to Aseptic Thermo Indicator Company, North Hollywood, Calif., a corporation of California
Filed July 10, 1961, Ser. No. 122,865
6 Claims. (Cl. 206—47)

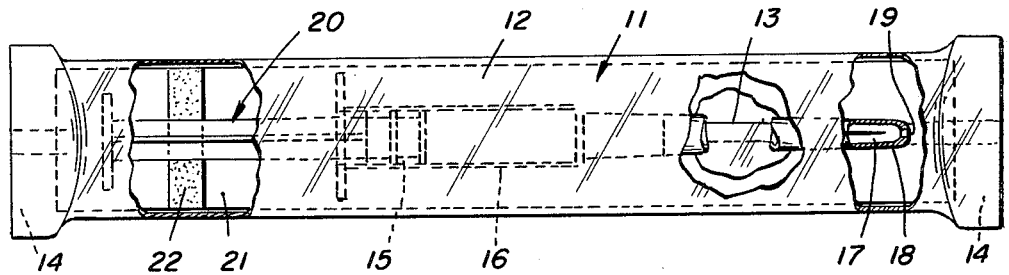
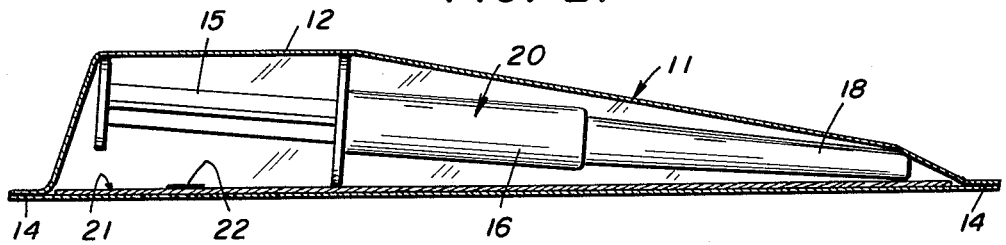
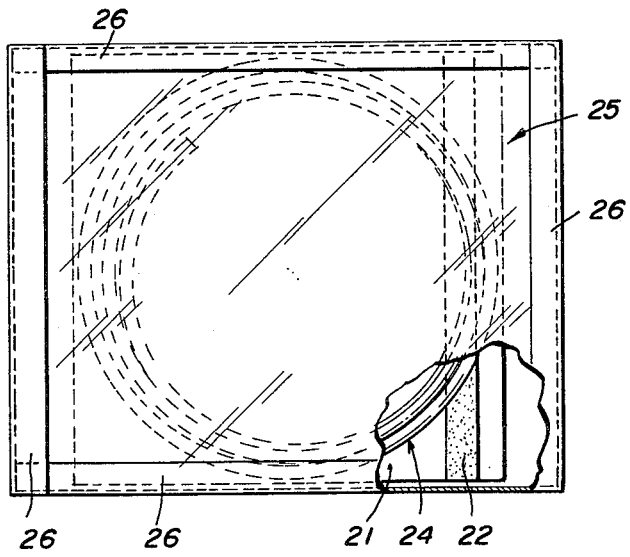
INVENTORS
WILLARD M. HUYCK
VINCENT A. ROMITO
BY
ATTORNEY United States Patent Office 3,093,242
Patented June 11, 1963

This invention relates to a packaged article which after sterilization with ethylene oxide maintains the article in an aseptic condition ready for immediate use.

Surgical, hospital, and clinical laboratory instruments such as syringes, catheters, intravenous injection needles, probes, plastic tubing, bandages, nipples, nursing bottles and the like made either wholly or in part of synthetic plastic materials such as polystyrene, polyethylene, polyamide, polyvinyl esters, are now made for one-time use. To be most useful it is desirable that these items be maintained in individual packages with indicator means showing that each package has been subjected to sterilizing conditions. Since the articles made of synthetic plastic materials do not withstand steam autoclave sterilization following the ordinary procedure, the packages and contents are most effectively treated with ethylene oxide under conditions which are known to provide sterilization, which conditions are indicated by individual tell-tales or indicators showing that a sterilizing combination of ethylene oxide concentration, moisture content, temperature, and time of contact, has existed.

The principal object of the invention is to provide individual instruments or articles in sealed packages made of material suitable for penetration by ethylene oxide for sterilization, and for the subsequent storage of the articles in sterilized condition. Another object is to provide sealed packages containing surgical, hospital, clinical laboratory instruments or other articles before, during and after subjection to sterilizing conditions by ethylene oxide treatment, with means for indicating that each individual package and contents has been subjected to sterilizing conditions, so that if the sealed packaging is unbroken, remains sterile. Another object is to provide sealed transparent packaging containing individual articles before, during and after ethylene oxide treatment including a moisture activated ethylene oxide sterilization indicator sealed inside the package. A further object is to provide in a sealed package containing an article which is subsequently to be used in sterile condition, a dry tell-tale indicator for ethylene oxide sterilization, and a moisture adsorbent material containing adsorbed moisture.

These and other objects are attained by my invention, which will be understood from the following description, reference being made to the accompanying drawings showing typical forms of packaging in which—

FIG. 1 is a plan view with parts broken away, partly in section, showing a syringe made principally of molded synthetic plastic parts and a sterilization tell-tale enclosed in a sealed package of transparent sheeted synthetic plastic;

FIG. 2 is a side elevational view of the same;

FIG. 3 is a plan view with parts broken away, partly in section, showing a sealed package containing a coil of plastic tubing and a sterilization indicator or tell-tale.

Referring to the drawings, particularly FIGS. 1 and 2, a sealed container 11 is made, for example, from transparent synthetic plastic packaging film, being first formed into a tubular member 12 having a sealed back seam 13 and having end seals 14. The film is permanently sealed together where it overlaps by means of an adhesive agent, or by self-sealing of the material under the influence of a heated sealer which presses the surfaces together in a manner well understood in the art. The instrument, in this illustrative case a syringe 20, is inserted in the tubular member before the end seals are completed. The syringe 20 consists of a plunger 15 slidably operable in a cylinder 16 to expel a liquid through the metal needle 17 which is attached to the end of the cylinder 16, there being a rigid plastic needle guard 18 having an opening 19 for the admission of the sterilizing gas around the needle, the guard being removable when the syringe 20 is to be used. With the article in the package there is enclosed a cardboard 21 having an imprint 22 of an ethylene oxide indicator ink, and descriptive printed matter relative to the article or the indicator. In FIG. 3 there is shown an alternative package in which the article is a coil of synthetic plastic tubing 24 enclosed within an envelope 25 formed from two sheets of synthetic plastic sheeted material which is sealed as by heat sealing at the four edges 26. There is also enclosed in this package before sealing a cardboard 21 on which is an imprint 22 of ethylene oxide indicator ink.

The packaging material for this invention is characterized by being formable into a sealed package containing the article, and by being permeable to ethylene oxide and at least partly permeable to water vapor, and by being impermeable to air-borne bacteria.

The packaging material may be selected from a wide variety of papers, cardboards and synthetic plastics. The package may be rigid or semi-rigid shaped containers made of these materials, or they may be fabricated as envelopes, bags, and the like, from sheets or films of synthetic plastics, plain and coated, and paper.

The film materials are preferably transparent because the article enclosed as well as the tell-tale may then be seen without unsealing the package. On the other hand, non-transparent material such as paper may also be used, in which case the tell-tale can only be inspected after the sealed package is opened.

Where the word "sealed" is used herein and in the claims, it is meant to include such complete closing of the package by adhesives or heat-sealing treatment or otherwise, that air-borne bacteria will not be carried into the package through openings in the so sealed areas.

Illustrative synthetic plastic films are cellophane, polystyrene, polyethylene, polyvinyl esters, cellulose acetate, polyamide, polyvinylidene, and coatings and laminations of these and other synthetic materials, as well as various kinds of waxed and coated papers, having the characterizing properties above set forth. Of the plastic films we prefer to use polyethylene film because of its toughness and its stability against cracking and tearing, and because of the ease of forming good seals in the overlapping sheets.

Since there is no visible change before and after sterilization by ethylene oxide, it is important that an indicator or tell-tale be included in the package to tell the user whether or not the individual packaged article has been subjected to sterilizing conditions. While any suitable tell-tale device which automatically integrates the sterilizing effects of time, concentration, moisture content, etc. may be used, we prefer to use a printed indicator ink which may be applied to a cardboard giving necessary instructions for interpreting the readings. The preferred ink composition makes use of the chemical reaction of ethylene oxide on magnesium chloride with water of crystallization, by which reaction magnesium hydroxide and epichlorohydrin are produced by the following reaction:

$$MgCl_2 \cdot 6H_2O + 2(CH_2)O = 2CH_2O \cdot H \cdot CH_2Cl + Mg(OH)_2 + 4H_2O$$

When a known amount of an acid is initially added to the composition, a known minimum amount of ethylene oxide will have been absorbed and reacted with the acid when the ink mass becomes alkaline, after exposure to moist ethylene oxide. This alkalinity is visually shown when an alkali-acid dye indicator in the composition changes color— for example, a sodium salt of bromphenol changes to purple when alkaline from the color yellow when the ink composition is acid.

A satisfactory indicator ink of this kind consists of a thickened liquid ink base, powdered magnesium chloride with water of crystallization ($MgCl_2 \cdot 6H_2O$), and a pH dye indicator. Flexographic type ink, which dries rapidly by evaporation, is preferred. Flexographic inks consist generally of (1) a vehicle or carrier-resin dissolved in a fast evaporating solvent, and (2) a pigment or dye. In this adaptation of a flexographic ink, a third ingredient, a reactant with ethylene oxide and moisture is also included, this being the water crystallized magnesium chloride ($MgCl_2 \cdot 6H_2O$). A fourth ingredient is the acidic material which reacts with the alkali liberated when ethylene oxide reacts with the magnesium chloride, as described above. The dye used in the ink composition for the purposes of giving a color change, is an acid-alkali indicator dye of the general nature of bromphenol blue. A white pigment is also preferably used with the indicator dye to enhance the color change.

A typical flexographic ink composition which, when printed out on paper and "dried," will qualitatively indicate the presence of moist ethylene oxide, would contain, in parts by weight:

1000 Standard solvent Socal #1
200 ethyl cellulose (viscosity 50 cps.)
25 polyethylene (Semet Solvay Petrochemical Div., Allied Chemical & Dye Corp. "A.C. No. 6")
75 powdered $MgCl_2 \cdot 6H_2O$
1 sodium salt of "Bromphenol Blue" (tetrabromophenol-sulphon-phthalein).

Insignia printed from the above composition, on 30 pound bleached kraft paper will change from yellow to blue when exposed to a concentration of 900 mg. per liter of ethylene oxide, at 30 to 80 percent relative humidity, for 5 to 10 minutes.

Powdered citric acid may be used to delay this indicator ink. For each 10 percent by weight addition of citric acid, based upon the above composition, the time of changing from yellow to blue is delayed by 30 minutes. It is thus possible to provide a printing ink from which telltale insignia may be printed which indicate exposures to ethylene oxide gas containing moisture for time periods from 5 to 10 minutes to several hours. After the time of exposure for desired or satisfactory sterilization has been ascertained (by the usual bacteriological tests), it it then only necessary to select the printing ink having the correct amount of citric acid to correspond to the selected sterilization time.

Ethylene oxide sterilization requires the presence of at least a small content of water vapor, and since water vapor is present in the usual ambient air, sterilization is effective if sufficiently high ethylene oxide concentration is maintained for a sufficiently long time. Some of the usual packaging materials are only slightly permeable to moisture. For sterilizing the sealed packages above described, it is advantageous to have present an additional source of moisture not only to insure that the contained article will be thoroughly sterilized, but also to provide, where necessary, an initial or starter amount of moisture so that the dried out indicator itself will charge color when subjected to the ethylene oxide which has permeated into the package.

It has been found that the moisture which is essential for proper sterilization and for initial activation of the tell-tale indicator can be incorporated in the form of adsorbed water in the paper or cardboard upon which the insignia of indicator ink is printed. For this purpose, we prefer to use a high moisture paper such as Riegel White Jersey Antique Finish. It is of course well known that paper as normally made and used contains adsorbed moisture to the extent of at least 4 or 5 percent, and that some papers because of their particular kind of cellulose fibers and fillers contain as high as 10 percent by weight of moisture. In the sealed enclosing packages of this invention, the inclusion of a card of such paper supplies enough moisture to assist in the activation of the ethylene oxide, as well as activate the printed ink tell-tale printed on the card, while appearing to be entirely dry, as in the normal condition of commercial paper. Other adsorbents, such as silica gel, to hold the small amount of water required inside the packages, may be added to the package in the form of tablets or pellets, when the adsorbent paper is omitted.

It is of course important that the material forming the package be impervious to air-borne bacteria, which necessarily come into contact with the package after removal from the sterilizing chamber, to avoid re-contamination after the original sterilization. This status of having once been subjected to sterilizing conditions is indicated by the changed color of the tell-tale printed insignias (changing from yellow to blue when the preferred indicator described above is used).

It is contemplated that other types of ethylene oxide indicators or tell-tales may also be used in the packages of this invention.

While we have shown in the drawings and have described typical surgical articles packaged for sterilization and storage, we contemplate that this invention is applicable to any kind of articles which it is desired to individually package, sterilize, and store.

Reference is made to our co-pending application Serial No. 43,320, filed July 18, 1960, now allowed, which discloses Printing Ink Composition for Ethylene Oxide Sterilization Indicators.

The advantages will be understood from the above description. The objective stated in the beginning have been attained.

We claim:

1. A package completely enclosing an article before, during, and after sterilization by exposure to ethylene oxide, comprising a sealed container made from a sheet material which is pervious to ethylene oxide but impervious to air-borne bacteria, and an ethylene oxide sterilization indicator consisting essentially of a dry mixture of magnesium chloride with water of crystallization, an acid, and an acid-alkali indicator dye which is enclosed within said container with the article prior to sealing.

2. The package defined in claim 1 in which a sealed container consists of film and laminates of synthetic plastic, said plastic selected from the group consisting of polyethylene, polyvinyl esters, polystyrene, polyamide, polyvinylidine esters, cellulose acetate, and regenerated cellulose.

3. The package defined in claim 1 in which the sealed container is paper.

4. A package completely enclosing an article before, during, and after sterilization by exposure to ethylene oxide, comprising a sealed container made from a sheet material which is pervious to ethylene oxide but impervious to air-borne bacteria, an ethylene oxide sterilization indicator which consists of dried ink insignia consisting essentially of a mixture of magnesium chloride with water of crystallization, an acid, an acid-alkali indicator dye, and a binder, said package also containing a solid moisture adsorbent containing adsorbed water while retaining its apparent dry condition whereby water vapor is provided within said sealed package.

5. A package completely enclosing an article before, during, and after sterilization by exposure to ethylene oxide, comprising a sealed container made from a sheet material which is pervious to ethylene oxide but impervious to air-borne bacteria, an ethylene oxide sterilization indicator which consists of dried ink insignia consisting essentially of a mixture of magnesium chloride with water of crystallization, an acid, an acid-alkali indicator dye, and a binder, said ink insignia being applied to a high moisture adsorbent paper base containing adsorbed water while retaining its apparent dry condition, whereby water vapor is provided within said sealed package.

6. A container for completely enclosing an article before, during and after sterilization by exposure to ethylene oxide, said container being fabricated from sheet packaging material which is pervious to ethylene oxide but impervious to air-borne bacteria; and an ethylene oxide indicator comprising printed insignia consisting essentially of a dry mixture of magnesium chloride with water of crystallization, an acid, and an acid-alkali indicator dye, enclosed within said container, said container being sealed against air-borne bacteria after said article and said indicator have been completely enclosed therein.

References Cited in the file of this patent

UNITED STATES PATENTS

| | | |
|---|---|---|
| 2,283,867 | Flosdorf et al. | May 19, 1942 |
| 2,370,768 | Baerwald | Mar. 6, 1945 |
| 2,524,162 | Chavannes et al. | Oct. 3, 1950 |
| 2,606,654 | Davis et al. | Aug. 12, 1952 |
| 2,750,719 | Wandelt | June 19, 1956 |